United States Patent
Wang

(10) Patent No.: US 12,350,709 B2
(45) Date of Patent: Jul. 8, 2025

(54) DAZZLING COLORED BASE LAYER, DECORATIVE FILM AND HOUSING, PROCESSING METHODS THEREFOR AND ELECTRONIC DEVICE

(71) Applicant: Beijing Xiaomi Mobile Software Co., Ltd., Beijing (CN)

(72) Inventor: Can Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 39 days.

(21) Appl. No.: 17/809,818

(22) Filed: Jun. 29, 2022

(65) Prior Publication Data
US 2023/0294130 A1    Sep. 21, 2023

(30) Foreign Application Priority Data
Mar. 17, 2022    (CN) .......................... 202210267587.7

(51) Int. Cl.
B05D 5/06    (2006.01)
B05D 3/12    (2006.01)
B05D 7/00    (2006.01)

(52) U.S. Cl.
CPC .............. *B05D 5/061* (2013.01); *B05D 3/12* (2013.01); *B05D 7/58* (2013.01)

(58) Field of Classification Search
CPC ........................................................ B05D 5/06
USPC ......................................................... 428/220
See application file for complete search history.

(56) References Cited

FOREIGN PATENT DOCUMENTS

| | | | | |
|---|---|---|---|---|
| CN | 109624579 A | * | 4/2019 | |
| CN | 113046696 A | | 6/2021 | |
| EP | 2147771 A2 | * | 1/2010 | ............. B29C 48/07 |
| EP | 2149801 A1 | | 2/2010 | |
| EP | 4184223 A1 | | 5/2023 | |
| EP | 4403351 A1 | | 7/2024 | |

OTHER PUBLICATIONS

Machine_English_translation_CN_109624579_A; Luo, et. al.; Preparation method of decorating film, decorating film, battery rear cover and electronic equipment; Apr. 16, 2019; EPO; whole document (Year: 2024).*

\* cited by examiner

*Primary Examiner* — Tahseen Khan
(74) *Attorney, Agent, or Firm* — McCoy Russell LLP

(57) ABSTRACT

A processing method for the dazzling colored base layer includes: outputting first materials and second materials alternately, a refractive index of the first materials being different from a refractive index of the second materials; obtaining a film by carrying out tape casting on the first materials and the second materials that are alternately arranged; and obtaining, by extending the film, the dazzling colored base layer having first material layers and second material layers that are alternately arranged, a thickness of the dazzling colored base layer being less than a thickness of the film.

7 Claims, 10 Drawing Sheets

DAZZLING COLORED BASE LAYER, DECORATIVE FILM AND HOUSING, PROCESSING METHODS THEREFOR AND ELECTRONIC DEVICE

CROSS-REFERENCE TO RELATED APPLICATION

The present application claims priority to Chinese Patent Application No. 202210267587.7 filed on Mar. 17, 2022. The entire contents of the above-listed application is hereby incorporated by reference for all purposes.

BACKGROUND

In the wake of unceasing growth in market demands and gradual increase in update frequency of terminal devices, consumers begin to pursue more decorative appearances of terminal devices.

In the related art, decorative appearances are produced generally through a multi-layer coating process, but a corresponding substrate carrier is required to be configured for each-layer of multi-layer coatings.

SUMMARY

The disclosure relates to the technical field of terminals, in particular to a dazzling colored base layer, a decorative film and a housing, processing methods therefor and an electronic device.

According to a first aspect of example of the disclosure, a processing method for a dazzling colored base layer is provided, and includes:
- outputting first materials and second materials alternately, a refractive index of the first materials being different from a refractive index of the second materials;
- obtaining a film by carrying out tape casting on the first materials and the second materials that are alternately arranged; and
- obtaining, by extending (or expanding) the film, the dazzling colored base layer having first material layers and second material layers that are alternately arranged, a thickness of the dazzling colored base layer being less than a thickness of the film.

The technical solution provided in the example of the disclosure may include the following beneficial effects:

It can be seen from the above example that, in the disclosure, a dazzling colored effect of the dazzling colored base layer is formed on the basis of different reflection effects of the first material layers and the second material layers that have different refractive indexes on visible light of different wavebands, such that when the dazzling colored base layer is subsequently configured to form the housing, the thickness of the housing is reduced while the dazzling colored effect of the housing is achieved.

It should be understood that the above general description and the following detailed description are only illustrative and explanatory, and may not limit the disclosure.

BRIEF DESCRIPTION OF THE DRAWINGS

The accompanying drawings herein, which are incorporated in the description as a constituent part of the description, illustrate the embodiments satisfying the disclosure and are used to explain the principles of the disclosure together with the description.

DETAILED DESCRIPTION

The embodiments will be described in detail herein and shown in the accompanying drawings illustratively. When the following descriptions relate to the accompanying drawings, unless otherwise specified, the same numeral in different accompanying drawings denotes the same or similar element. The implementations described in the following embodiments do not denote all implementations consistent with the disclosure. On the contrary, the implementations are merely embodiments of devices and methods consistent with some aspects of the present disclosure.

The terms used in the disclosure are merely to describe the specific embodiments, instead of limiting the disclosure. The singular forms such as "a", "the" and "this" used in the present disclosure are also intended to include plural forms, unless otherwise clearly stated in the context. It should also be understood that the term "and/or" used herein refers to and includes any or all possible combinations of one or more of the associated listed items.

It should be understood that although the terms "first", "second", "third", etc. may be employed in the disclosure to describe various information, such information should not be limited to these terms. These terms are merely used to distinguish the same type of information from each other. For example, first information could also be referred to as second information, and similarly, second information could also be referred to as first information, without departing from the scope of the disclosure. Depending on the context, the word "if" as used herein may be interpreted as "in the case of", "under the condition that" or "in response to determining".

Since in the related art, a corresponding substrate carrier is required to be configured for each-layer of multi-layer coatings, which will sacrifice a thickness of an appearance film, and further affect utilization of a thickness space of an electronic device.

Figure 1:
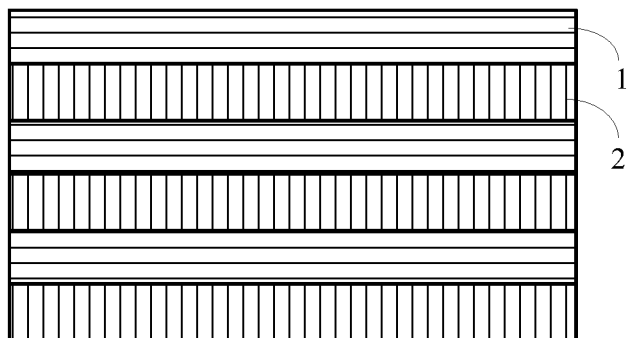
FIG. 1 is a schematic sectional view of a dazzling colored base layer illustrated according to an embodiment.
Figure 2:
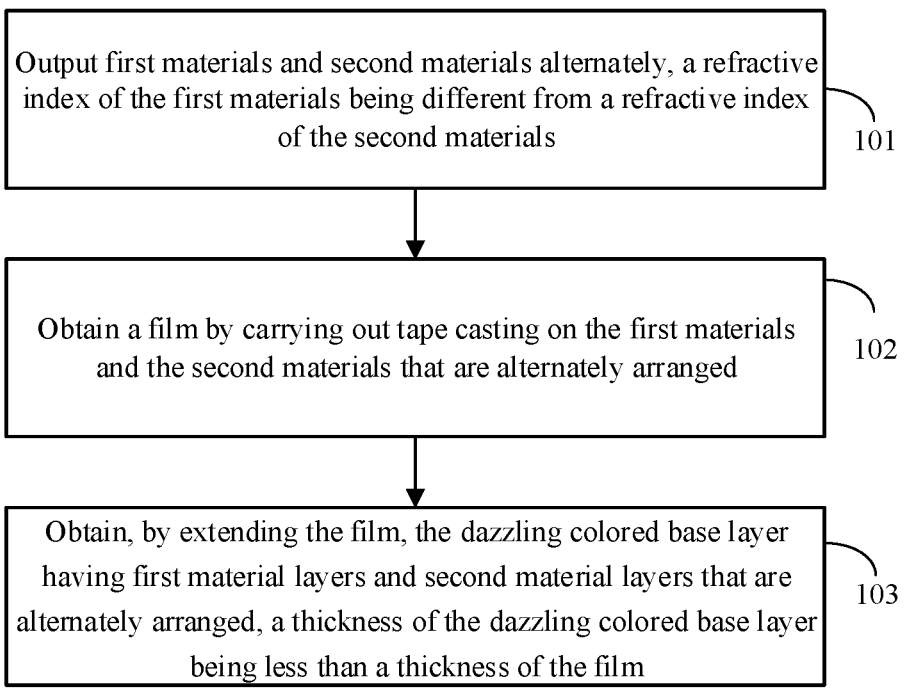
FIG. 2 is a flow diagram of a processing method for a dazzling colored base layer illustrated according to an embodiment.

FIG. 1 is a first schematic sectional view of a dazzling colored base layer 100 illustrated according to an embodiment. FIG. 2 is a second flow diagram of a processing method for a dazzling colored base layer 100 illustrated according to an embodiment. As shown in FIG. 2, a processing method for the dazzling colored base layer 100 may include the following steps:

Step 101, output first materials and second materials alternately, a refractive index of the first materials being different from a refractive index of the second materials.

In this example, the first materials and the second materials may be the same type of materials, but the refractive index of the first materials is different from the refractive index of the second materials. For example, the first materials and the second materials may include organic resin, but the refractive index of the organic resin as the first materials is different from the refractive index of the organic resin as the second materials. Specifically, the first materials and the second materials may both include polyethylene terephthalate polymers. Each of the refractive index of the first materials and the refractive index of the second materials may be greater than or equal to 1.58 and less than or equal to 1.65. As an embodiment in which the refractive index of the first materials is greater than the refractive index of the second materials, the refractive index of the first materials may be between 1.61-1.65, and the refractive index of the second materials may be between 1.58-1.61, which are merely embodiments, as long as the refractive index of the first materials and the refractive index of the second materials are both within an interval of 1.58-1.65, and the refractive index of the first materials is not equal to the refractive index of the second materials.

The first materials may be output from a first discharge port provided on a feeding apparatus, the second materials may be output from a second discharge port provided on a feeding apparatus, the first materials and the second materials may be alternately output by alternately controlling working states of the first discharge port and the second discharge port, and the first materials and the second materials that are alternately output may be stacked.

Step 102, obtain a film by carrying out tape casting on the first materials and the second materials that are alternately arranged.

In this example, the film is obtained by carrying out, may through a tape casting process, tape casting on the first materials and the second materials that are stacked, and a melting temperature in a process of tape casting carried out through the tape casting process is larger than or equal to 260° C. and lower than or equal to 290° C. In the process of tape casting, the first materials and the second materials that are adjacent to each other in a molten state may be combined, so as to improve strength of the film. The film subjected to the tape casting process may have a thickness greater than or equal to 1 mm and less than or equal to 5 mm.

Step 103, obtain, by extending the film, the dazzling colored base layer 100 having first material layers 1 and second material layers 2 that are alternately arranged, a thickness of the dazzling colored base layer 100 being less than a thickness of the film. each of a refractive index of the first material layers and a refractive index of the second material layers is greater than or equal to 1.58 and less than or equal to 1.65.

In this example, in order to reduce the thickness of the dazzling colored base layer 100, the dazzling colored base layer 100 as shown in FIG. 1 having the first material layers 1 and the second material layers 2 that are alternately arranged may be obtained by extending the film obtained in the step 102, and the thickness of the dazzling colored base layer 100 is less than the thickness of the film obtained in step 102, so as to facilitate reduction of the thickness of the housing configured with the dazzling colored base layer 100.

Specifically, a secondary film may be obtained by stretching the film in a first direction, and then the dazzling colored base layer 100 is obtained by stretching the secondary film in a second direction. The first direction is perpendicular to the second direction. As an embodiment in which the film is square, the secondary film may be obtained by stretching the film in a transverse direction, so as to increase a width of the secondary film obtained by means of stretching, and then the dazzling colored base layer 100 is obtained by stretching the secondary film in a longitudinal direction, so as to increase a length of the dazzling colored base layer 100, such that the dazzling colored base layer 100 satisfying size requirements is obtained. For some films in irregular shapes, the films may be cut into regular shapes and then stretched in the first direction and the second direction, or the films may be directly stretched in two directions that are perpendicular to each other without being cut, which is not limited in the disclosure.

The step of stretching the film in a first direction may be realized by the following process that the film is heated to a temperature larger than or equal to 85° C. and lower than or equal to 95° C., and then the secondary film is obtained by stretching the film in the first direction. When the film is heated and then is stretched in the first direction, the film may be stretched after being softened, so as to reduce stretching difficulty. Similarly, the step of stretching the secondary film in the second direction may be realized by the following process that the secondary film is heated to a temperature larger than or equal to 100° C. and lower than or equal to 120° C., and then the dazzling colored base layer 100 is obtained by stretching the heated secondary film in the second direction. When the secondary film is heated and then is stretched in the second direction, the secondary film may be stretched after being softened, so as to reduce stretching difficulty.

In the technical solution of the disclosure, the dazzling colored base layer 100 obtained by extending the film may be further subjected to a heat setting process, that is, the dazzling colored base layer 100 may be heat-set through the heat setting process, and then the heat-set dazzling colored base layer 100 is rolled. Optionally, the temperature of the heat set dazzling colored base layer 100 is larger than or equal to 230° C. and lower than or equal to 240° C. By heat setting the dazzling colored base layer 100, deformation of the dazzling colored base layer 100 caused in a stretching process may be eliminated or reduced, so as to make a rolling effect of the rolled dazzling colored base layer 100 better. Of course, it could be understood that before the dazzling colored base layer 100 is rolled, the dazzling colored base layer 100 obtained by means of extending may be cut according to size requirements. For example, the dazzling colored base layer 100 obtained by means of extending may have a width of 1 m-5 m, then the dazzling colored base layer 100 may be cut into a plurality of pieces each having a less width, such as small pieces of the dazzling colored base layer 100 each having a width of 200 mm-500 mm, and then the small pieces of the dazzling colored base layer 100 each having a narrower width are rolled. Of course, in some cases, the dazzling colored base layer 100 may be cut into a plurality of pieces each having a less length, and then the small pieces of colorful base layer 100 each having a less length are rolled. In some other cases, a plurality of small pieces of colorful base layer 100 may be obtained by cutting the dazzling colored base layer 100 in a width direction and a length direction respectively, and then are rolled respectively. Specifically, the dazzling colored base layer 100 may be cut and designed according to size requirements, which is not limited in the disclosure.

In the above example, the first material layers 1 may be formed by curing the first materials, and the second material layers 2 may be formed by curing the second materials. For example, under the condition that the first materials and the second materials each include organic resin, the first material layers 1 and the second material layers 2 each may include an organic resin layer. Specifically, the organic resin layer may be a polyethylene terephthalate polymer layer. Compared with inorganic film layers, organic resin layers serving as the first material layers 1 and the second material layers 2 have the advantages that color dyes, chromotropic dyes or other functional dyes may be added, which is conducive to further improving a color effect of the dazzling colored base layer 100.

In this example shown in FIG. 1, an embodiment in which three first material layers 1 and three second material layers 2 are alternately arranged is taken. In fact, in other embodiments, other number of layers of the first material layers 1 and other number of layers of the second material layers 2 may be used, the total number of layers of the first material layers 1 and the second material layers 2 is greater than or equal to 100 and less than or equal to 1000, and a layer difference between the number of the first material layers 1 and the number of the second material layers 2 is greater than or equal to 0 and less than or equal to 1. For example, shown in FIG. 1, in a thickness direction of the dazzling colored base layer 100, a first layer of the dazzling colored base layer 100 may be the first material layer 1, and a last layer of the dazzling colored base layer 100 may be the second material layer 2. In fact, in other embodiments, in the thickness direction of the dazzling colored base layer 100, the first layer of the dazzling colored base layer 100 may be the first material layer 1, and the last layer of the dazzling colored base layer 100 may also be the first material layer 1. Alternatively, the first layer of the dazzling colored base layer 100 may be the second material layer 2, and the last layer of the dazzling colored base layer 100 may also be the second material layer 2, which is not limited in the disclosure. Each of the first material layer 1 and the second material layer 2 may have a light transmittance greater than or equal to 90%, so as to provide a better dazzling colored effect. In other embodiments, one of the first material layer 1 and the second material layer 2 may have a light transmittance greater than or equal to 90%, which is not limited in the disclosure.

In the above example, the dazzling colored base layer 100 may have a thickness greater than or equal to 20 μm and less than or equal to 100 μm. By limiting a total thickness of the dazzling colored base layer 100, a thickness of the first material layer 1 and a thickness of the second material layer 2 may be limited. For example, each of the first material layer 1 and the second material layer 2 may have a thickness greater than or equal to 50 nm and less than or equal to 500 nm. Thus, by using the first material layer 1 and the second material layer 2 each having a nano-scale thickness, a thickness of the dazzling colored base layer 100 may be reduced as a whole. Of course, in other embodiments, the first material layer 1 or the second material layer 2 may have a thickness greater than or equal to 50 nm and less than or equal to 500 nm, which may also reduce the thickness of the dazzling colored base layer 100.

In the above example, after incidence of visible light of each waveband into the dazzling colored base layer 100, the visible light of each waveband may be repeatedly absorbed and reflected in the dazzling colored base layer 100. The dazzling colored effect of the dazzling colored base layer 100 may be formed by means of different reflection effects of the first material layers 1 and the second material layers 2 on the visible light of different wavebands. Further, a reflectivity of the dazzling colored base layer 100 to a visible light of a specific waveband may be adjusted by adjusting the total number of the dazzling colored base layer 100, the thickness of the first material layer 1 or the thickness of the second material layer 2, so as to finally achieve a target dazzling colored effect.

Figure 3:
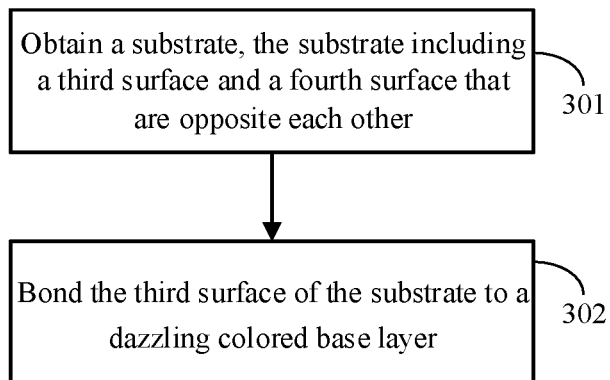
FIG. 3 is a first flow diagram of a processing method for a housing illustrated according to an embodiment.
Figure 4:
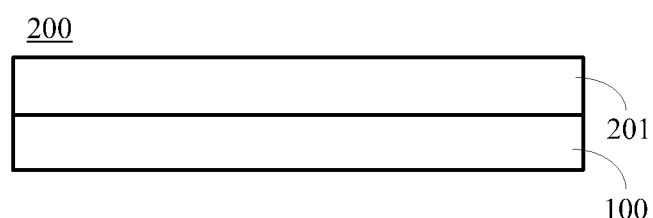
FIG. 4 is a first schematic sectional view of a housing illustrated according to an embodiment.

On the basis of the dazzling colored base layer 100 shown in FIGS. 1 and 2, as shown in FIGS. 3 and 4, the disclosure further provides a housing 200. The housing 200 may include a substrate 201 and the dazzling colored base layer 100 bonded to the substrate 201. Specifically, a processing method for the housing 200 may include the following steps:

Step 301, obtain a substrate 201, the substrate 201 including a third surface and a fourth surface that are opposite each other.

In this example, the substrate 201 may include a glass substrate, a sapphire substrate, a transparent polymer substrate or a transparent composite material substrate. The transparent polymer may include one or more composite materials of polyethylene glycol terephthalate, carbonic ester, polymethyl methacrylate, polycarbonate and polymethyl methacrylate. A thickness of the substrate 201 may be designed according to a thickness requirement of the housing 200. For example, the substrate 201 may have a thickness greater than or equal to 0.1 mm and less than or equal to 0.5 mm. The substrate 201 may be shaped two-dimensionally, two-and-a-half-dimensionally or three-dimensionally according to a shape requirement of the housing 200. The glass substrate and the sapphire substrate may be formed into three-dimensional structures by means of hot bending. Transparent polymers and transparent composite materials may be formed into three-dimensional structures at a high pressure by means of a mold.

Step 302, obtain the housing 200 by bonding the substrate 201 to the dazzling colored base layer 100.

In this example, the dazzling colored base layer 100 may be bonded to the third surface of the substrate 201, the housing 200 may include a battery cover, and the dazzling colored base layer 100 may display a dazzling colored effect through the substrate 201, such that the housing 200 may have a dazzling colored effect. Compared with a solution of achieving a dazzling colored effect by stacking a plurality of coatings in the related art, the technical solution of the disclosure achieves a better dazzling colored effect higher in reflectivity and brightness and a smaller thickness.

Figure 5:
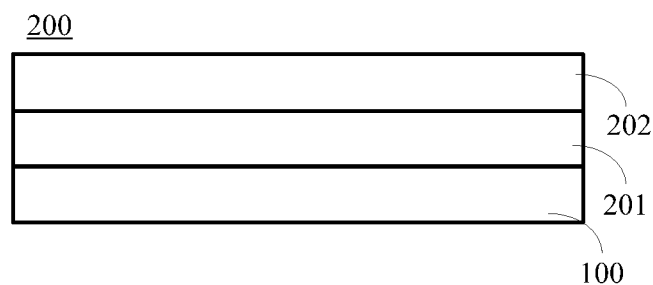
FIG. 5 is a second schematic sectional view of a housing illustrated according to an embodiment.

Specifically, the substrate 201 may be bonded to the dazzling colored base layer 100. For example, a bonding layer may be bonded to the substrate 401 in advance, then the dazzling colored base layer 100 is unrolled, and the unrolled dazzling colored base layer 100 is bonded to the bonding layer. Alternatively, the bonding layer may be bonded to the dazzling colored base layer 100 to form a roll, and then the roll is unrolled to be bonded to the substrate 201 after a cover film of the bonding layer is torn off, which may be specifically designed as required and is not limited in the disclosure. Further, as shown in FIG. 5, the housing 200 may further include an anti-fingerprint layer 202. The corresponding processing method for the housing 200 may further include: form an anti-fingerprint layer on the fourth surface of the substrate 201. The anti-fingerprint layer may form an outer surface of the housing 200, which may be conducive to reducing dirt in a process of holding the device by a user and maintenance of cleanliness of the device.

Figure 6:
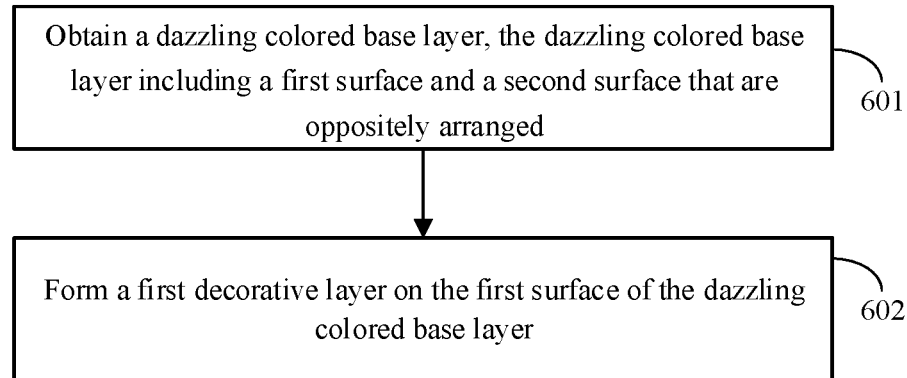
FIG. 6 is a first flow diagram of a processing method for a decorative film illustrated according to an embodiment.
Figure 7:
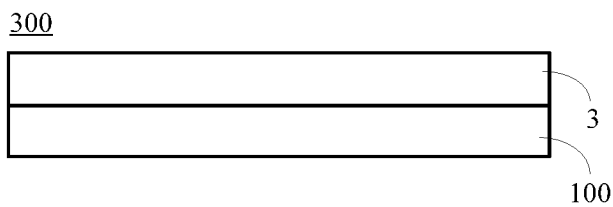
FIG. 7 is a first schematic sectional view of a decorative film illustrated according to an embodiment.

On the basis of the technical solution of the disclosure, as shown in FIGS. 6 and 7, the disclosure further provides a decorative film 300. The decorative film 300 may include a dazzling colored base layer 100 and a first decorative layer 3, the dazzling colored base layer 100 may include a first surface and a second surface that are oppositely arranged, and the first decorative layer 3 may be arranged on the first surface of the dazzling colored base layer 100. Specifically, the processing method for the decorative film 300 may include the following steps:

Step 601, obtain a dazzling colored base layer 100, the dazzling colored base layer 100 including a first surface and a second surface that are oppositely arranged.

In this example, the dazzling colored base layer 100 may be obtained through the processing method of any one of the above embodiments, which will not be repeated in detail herein.

Step 602, form a first decorative layer 3 on the first surface of the dazzling colored base layer 100.

In this example, by forming the first decorative layer 3 on the first surface of the dazzling colored base layer 100, the dazzling colored effect of the decorative film 300 may be further enriched. Moreover, the dazzling colored base layer 100 is prevented from directly reflecting visible light to naked eyes, so as to improve visual enjoyment of a user.

In some embodiments, the first decorative layer 3 may include a semitransparent ink layer, and the semitransparent ink layer is formed on the first surface of the dazzling colored base layer 100. Specifically, the semitransparent ink layer may be formed on the first surface of the dazzling colored base layer 100 through a winding spreading process, that is, the dazzling colored base layer 100 in a roll may be unrolled by means of a first device, and an unrolled portion of the dazzling colored base layer 100 may be coated with the semitransparent ink layer and then rolled after the semitransparent ink layer satisfies requirements. The semitransparent ink layer may have a thickness greater than or equal to 1 µm and less than or equal to 6 µm, and the semitransparent ink layer may show a color effect, such as the semitransparent ink layer may show violet, blue, green, black, red or yellow. By means of the semitransparent ink layer, the decorative film 300 may mainly show a color effect of the semitransparent ink layer itself, and moreover, in combination with the dazzling colored effect of the dazzling colored base layer 100, dazzling colored display with the color effect may be achieved.

In other embodiments, the first decorative layer 3 may include a first coating layer, and the first coating layer may be formed on the first surface of the dazzling colored base layer 100. Specifically, the first coating layer may be formed on the surface of the dazzling colored base layer 100 through a winding coating process, that is, the dazzling colored base layer 100 in a roll may be unrolled by means of a first device, and an unrolled portion of the dazzling colored base layer 100 may be coated to form the first coating layer and then rolled after the first coating layer satisfies requirements. By means of the first coating layer, brightness and color richness of the decorative film 300 may be increased. The first coating layer may include first metal oxide layers and second metal oxide layers that are alternately arranged, and a material of the first metal oxide layers is different from a material of the second metal oxide layers. The first metal oxide layers and the second metal oxide layers may each include a titanium oxide layer, a silicon oxide layer or a niobium oxide layer separately, which may be specifically designed as required and is not limited in the disclosure.

Figure 8:
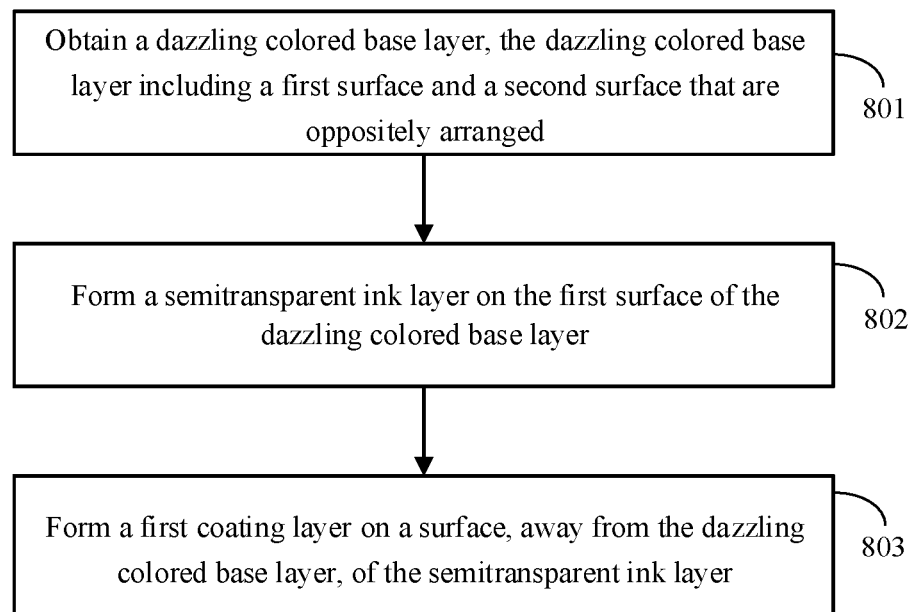
FIG. 8 is a second flow diagram of a processing method for a decorative film illustrated according to an embodiment.
Figure 9:
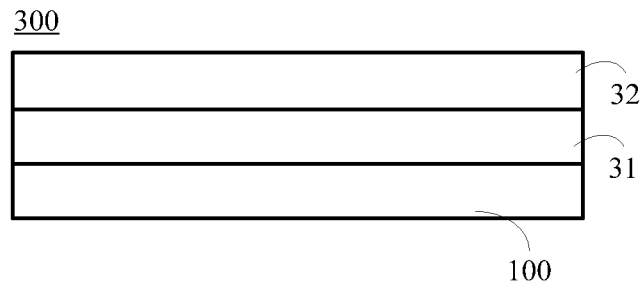
FIG. 9 is a second schematic sectional view of a decorative film illustrated according to an embodiment.

In some other embodiments, as shown in FIGS. 8 and 9, the first decorative layer 3 may include a semitransparent ink layer 31 and a first coating layer 32. The semitransparent ink layer 31 is arranged on the first surface of the dazzling colored base layer 100, and the first coating layer 32 is arranged on a surface, away from the dazzling colored base layer 100, of the semitransparent ink layer 31. Specifically, the processing method for the decorative film 300 may include:

Step 801, obtain a dazzling colored base layer 100, the dazzling colored base layer 100 including a first surface and a second surface that are oppositely arranged.

In this example, the dazzling colored base layer 100 may be obtained through the processing method of any one of the above embodiments, which will not be repeated in detail herein.

Step 802, form a semitransparent ink layer 31 on the first surface of the dazzling colored base layer 100.

Step 803, form a first coating layer 32 on a surface, away from the dazzling colored base layer 100, of the semitransparent ink layer 31.

In this example, for a processing technology and related solutions of the semitransparent ink layer 31, and a processing technology and related solutions of the first coating layer 32, reference may be made to the above embodiments, which will not be repeated in detail herein.

Figure 10:
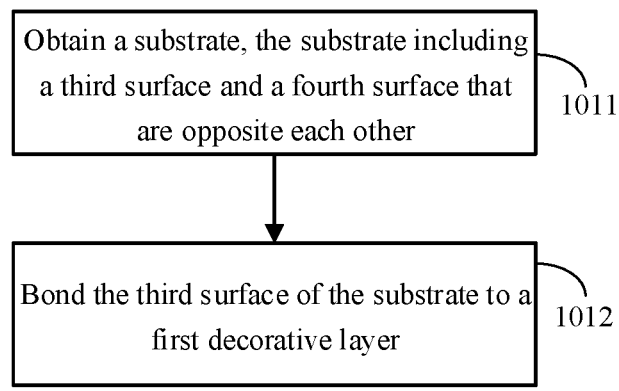
FIG. 10 is a second flow diagram of a processing method for a housing illustrated according to an embodiment.
Figure 11:
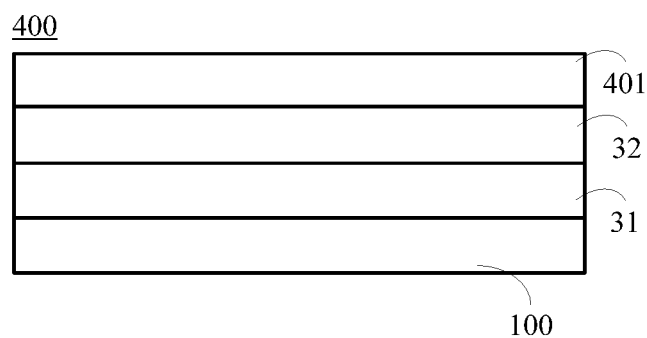
FIG. 11 is a third schematic sectional view of a housing illustrated according to an embodiment.

On the basis of the decorative film 300 provided in FIGS. 8 and 9, as shown in FIGS. 10 and 11, the disclosure further provides a housing 400. The housing 400 may include a substrate 401 and the decorative film 300. Specifically, the processing method for the housing 400 may include the following steps:

Step 1011, obtain a substrate 401, the substrate 401 including a third surface and a fourth surface that are opposite each other.

In this example, for the step 1011, reference may be made to step 301, which will not be repeated in detail herein.

Step 1012, obtain the housing 400 by bonding the substrate 401 to the first decorative layer 3 of the decorative film 300.

In this example, the first decorative layer 3 may include a semitransparent ink layer 31 and a first coating layer 32, the semitransparent ink layer 31 may be arranged between the first coating layer 32 and the dazzling colored base layer 100, and the first coating layer 32 is bonded to the substrate 401. By means of the semitransparent ink layer 31, a main display color effect of the housing 400 may be designed; in combination with the dazzling colored base layer 100, the dazzling colored effect may be achieved; and by means of the first coating layer 32, brightness and color richness of the housing 400 may be increased.

Figure 12:
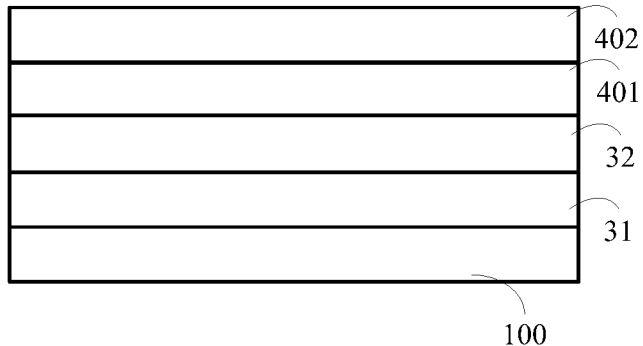
FIG. 12 is a fourth schematic sectional view of a housing illustrated according to an embodiment.

Specifically, the substrate 401 may be bonded to the first coating layer 32 of the first decorative layer 3. For example, a bonding layer may be bonded to the substrate 401 in advance, then the decorative film 300 is unrolled, and the unrolled decorative film 300 is bonded to the bonding layer. Alternatively, the bonding layer may be bonded to the decorative film 300 to form a roll, and then the roll is unrolled to be bonded to the substrate 401 after a cover film of the bonding layer is torn off, which may be specifically designed as required and is not limited in the disclosure. Further, as shown in FIG. 12, the housing 400 may further include an anti-fingerprint layer 402, and the corresponding processing method for the housing 400 may further include: form an anti-fingerprint layer on the fourth surface of the substrate 401. The anti-fingerprint layer 402 may form an outer surface of the housing 400, which may be conducive to reducing dirt in a process of holding the device by a user and maintaining cleanliness of the device.

It should be noted that here only take the housing 400 formed under the condition that the first decorative layer 3 includes the semitransparent ink layer 31 and the first coating layer 32 as an embodiment for description. In fact, in other embodiments, the housing may also be processed under the condition that the first decorative layer 3 includes the semitransparent ink layer, and in this case, the semitransparent ink layer is bonded to the substrate of the housing, and for the process steps, reference may be made to the above embodiments. Similarly, the housing may also be processed under the condition that the first decorative layer 3 includes the first coating layer, and in this case, the first coating layer is bonded to the substrate of the housing, and for the process steps, reference may be made to the above embodiments.

In the above example, the semitransparent ink layer is formed on the dazzling colored base layer 100 through the winding spreading process, and the first coating layer is formed through the winding coating process. Compared with the solution in the related art that a separate PET (polyethylene terephthalate) substrate is required to be provided for a coating layer to serve as a carrier, the solution of the above example has the advantages that a preparation effect of the decorative film 300 may be improved, and overall preparation difficulty and preparation cost of the decorative film 300 may be reduced.

Figure 13:
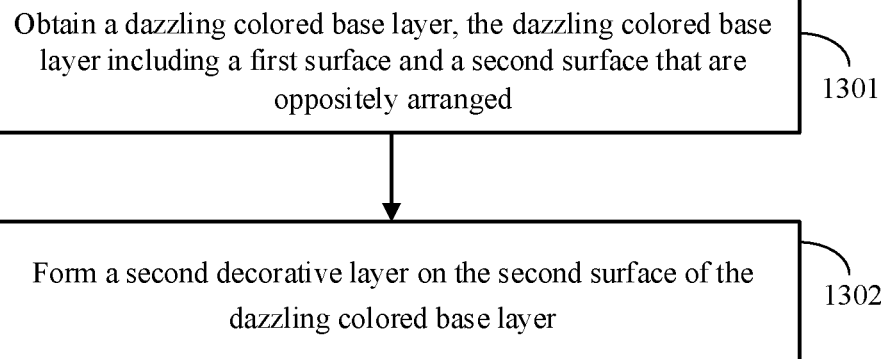
FIG. 13 is a third flow diagram of a processing method for a decorative film illustrated according to an embodiment.
Figure 14:
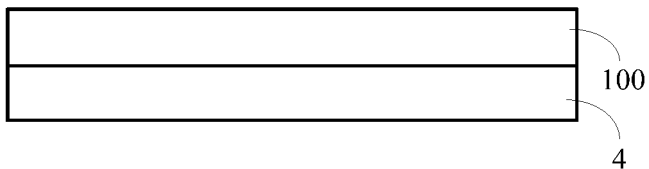
FIG. 14 is a third schematic sectional view of a decorative film illustrated according to an embodiment.

On the basis of the technical solution of the disclosure, as shown in FIGS. 13 and 14, the disclosure further provides a decorative film 500. The decorative film 500 may include a dazzling colored base layer 100 and a second decorative layer 4, the dazzling colored base layer 100 may include a first surface and a second surface that are oppositely arranged, and the second decorative layer 4 may be arranged on the second surface of the dazzling colored base layer 100. Specifically, the processing method for the decorative film 500 may include the following steps:

Step 1301, obtain a dazzling colored base layer 100, the dazzling colored base layer 100 including a first surface and a second surface that are oppositely arranged.

In this example, the dazzling colored base layer 100 may be obtained through the processing method of any one of the above embodiments, which will not be repeated in detail herein.

Step 1302, form a second decorative layer 4 on the second surface of the dazzling colored base layer 100.

In this example, the second decorative layer 4 is formed on the second surface of the dazzling colored base layer 100, so as to protect the dazzling colored base layer 100.

In some embodiments, the second decorative layer may include a cover bottom ink layer, and specifically, the cover bottom ink layer may be formed on the second surface of the dazzling colored base layer 100. Subsequently, when the decorative film 500 is bonded to the housing, the first surface of the decorative film 500 may be connected to a substrate of the housing, and the cover bottom ink layer may protect the dazzling colored base layer 100.

Figure 15:
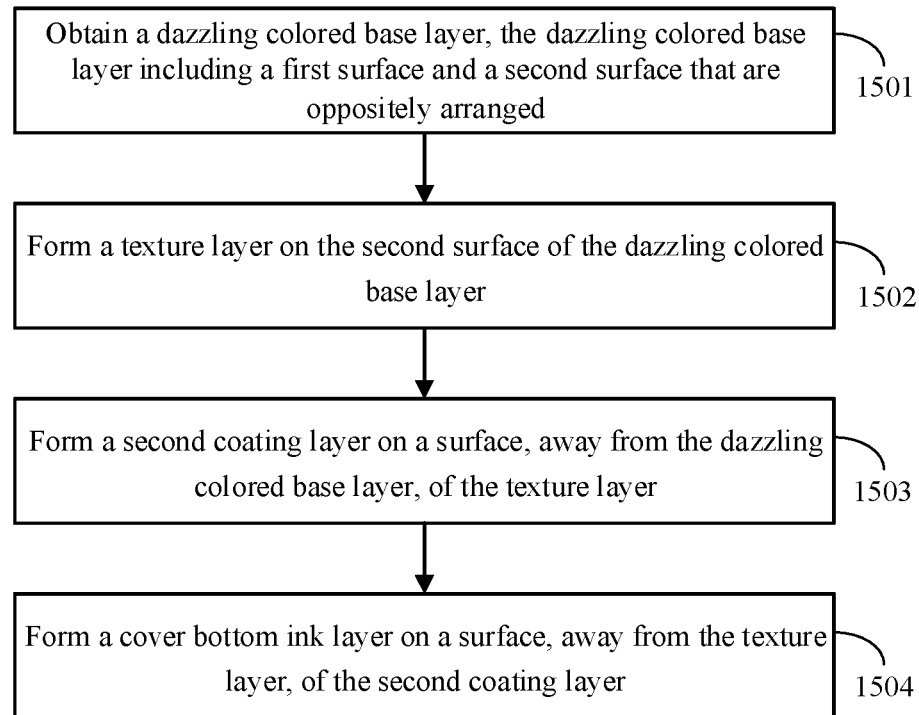
FIG. 15 is a fourth flow diagram of a processing method for a decorative film illustrated according to an embodiment.
Figure 16:
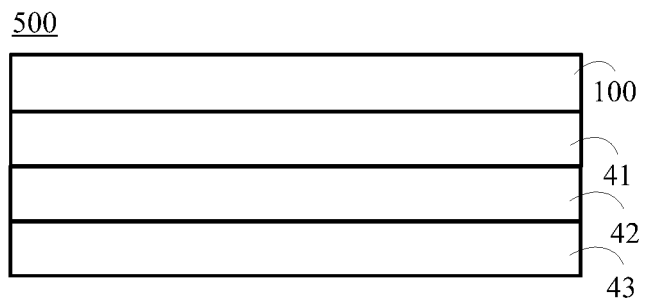
FIG. 16 is a fourth schematic sectional view of a decorative film illustrated according to an embodiment.

In some other embodiments, as shown in FIGS. 15 and 16, the second decorative layer 4 may include a texture layer 41, a second coating layer 42 and a cover bottom ink layer 43. The texture layer 41 is arranged on the second surface of the dazzling colored base layer 100, the second coating layer 42 is arranged on a surface, away from the dazzling colored base layer 100, of the texture layer 41, and the cover bottom ink layer 43 is arranged on a surface, away from the texture layer 41, of the second coating layer 42. The processing method for the decorative film 500 may include:

Step 1501, obtain a dazzling colored base layer 100, the dazzling colored base layer 100 including a first surface and a second surface that are oppositely arranged.

In this example, the dazzling colored base layer 100 may be obtained through the processing method of any one of the above embodiments, which will not be repeated in detail herein.

Step 1502, form a texture layer 41 on the second surface of the dazzling colored base layer 100.

In this example, the texture layer 41 may be a UV texture layer. The texture layer 41 may be formed by forming a texture pattern on a UV texture mold in advance by means of laser engraving, machining or bionic transfer printing, and then transferring the texture pattern to the second surface of the dazzling colored base layer 100 by means of the UV texture mold and UV texture glue. The UV texture layer may have a thickness greater than or equal to 0.008 mm and less than or equal to 0.05 mm. The decorative film 500 may have a texture effect by means of the texture layer 41, so as to enrich an appearance effect of the decorative film 500.

Step 1503, form a second coating layer 42 on a surface, away from the dazzling colored base layer 100, of the texture layer 41.

In this example, the second coating layer 42 may be formed on the surface of the texture layer 41 with a magnetron sputtering coating process or an evaporation coating process. The second coating layer 42 may include one or more of silicon oxide, niobium oxide and indium oxide. Under the condition that the second coating layer 42 includes a plurality of materials, the plurality of materials may be stacked. The second coating layer 42 may have a thickness greater than or equal to 40 nm and less than or equal to 300 nm. Brightness of the decorative film 500 may be increased by the second coating layer 42, and an effect of the second coating layer 42 will not be blocked due to a high transmittance of the texture layer 41.

Step 1504, form a cover bottom ink layer 43 on a surface, away from the texture layer 41, of the second coating layer 42.

In this example, the second coating layer 42 may be coated with the cover bottom ink layer 43 by means of screen printing. By means of the cover bottom ink layer 43, an overall color effect is shown, and the texture layer 41 and the second coating layer 42 are protected.

Figure 17:
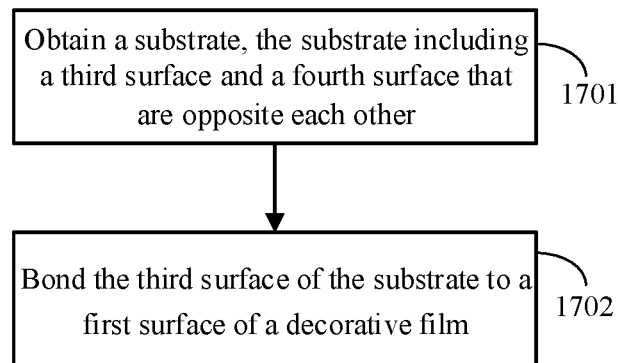
FIG. 17 is a third flow diagram of a processing method for a housing illustrated according to an embodiment.
Figure 18:
FIG. 18 is a fifth schematic sectional view of a housing illustrated according to an embodiment.

On the basis of the decorative film 500 provided in FIGS. 15 and 16, as shown in FIGS. 17 and 18, the disclosure further provides a housing 600. The housing 600 may include a substrate 601 and the decorative film 500. Specifically, the processing method for the housing 600 may include the following steps:

Step 1701, obtain a substrate 601, the substrate 601 including a third surface and a fourth surface that are opposite each other.

In this example, for the step 1701, reference may be made to step 301, which will not be repeated in detail herein.

Step 1702, obtain the housing 600 by bonding the third surface of the substrate 601 to the first surface of a dazzling colored base layer 100 of the decorative film 300.

Figure 19:
FIG. 19 is a sixth schematic sectional view of a housing illustrated according to an embodiment.

In this example, the second decorative layer 4 may include a texture layer 41, a second coating layer 42 and a cover bottom ink layer 43. The texture layer 41 is arranged on the second surface of the dazzling colored base layer 100, and the first surface of the dazzling colored base layer 100 is bonded to the third surface of the substrate 601. For example, a bonding layer may be bonded to the substrate 601 in advance, then the dazzling colored base layer 100 is unrolled, and the unrolled colorful base layer 100 is bonded to the bonding layer. Alternatively, the bonding layer may be bonded to the dazzling colored base layer 100 to form a roll, and the roll is unrolled to be bonded to the substrate 601 after a cover film of the bonding layer is torn off, which may be specifically designed as required and is not limited in the disclosure. Then the texture layer 41, the second coating layer 42 and the cover bottom ink layer 43 may be sequentially formed on one side, away from the substrate 601, of the dazzling colored base layer 100. Further, as shown in FIG. 19, the housing 600 may further include an anti-fingerprint layer 602, and the corresponding processing method for the housing 600 may further include: form an anti-fingerprint layer on the fourth surface of the substrate 601. The anti-fingerprint layer 602 may form an outer surface of the housing 600, which may be conducive to reducing dirt in a process of holding the device by a user and maintaining cleanliness of the device.

In the above example, a process flow under the condition that the second decorative layer 4 includes the texture layer 41, the second coating layer 42 and the cover bottom ink layer 43, the decorative film 500 is used for forming the housing 600 is used for description. In other embodiments, under the condition that the second decorative layer 4 includes the cover bottom ink layer 43, the cover bottom ink layer 43 may form the second surface of the dazzling colored base layer 100, and the first surface of the dazzling colored base layer 100 may be bonded to the substrate 601 of the housing 600. For other specific implementations, reference may be made to the above embodiments, which will not be repeated in detail herein.

Figure 20:
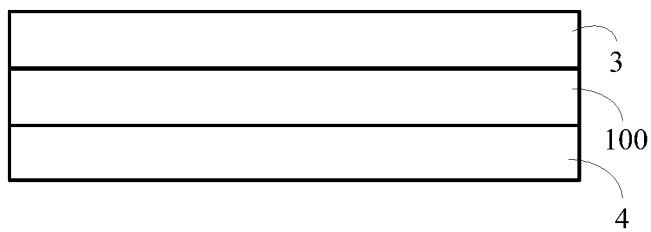
FIG. 20 is a fifth schematic sectional view of a decorative film illustrated according to an embodiment.
Figure 21:
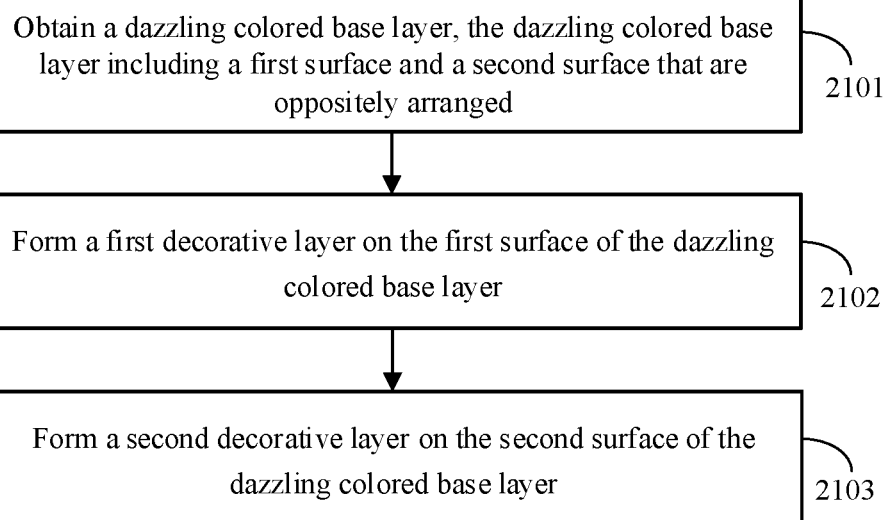
FIG. 21 is a fifth flow diagram of a processing method for a decorative film illustrated according to an embodiment.

In the above example, an embodiment in which the decorative film 300 includes the first decorative layer 3 and the dazzling colored base layer 100 and the decorative film 500 includes the second decorative layer 4 and the dazzling colored base layer 100 is taken for description. In fact, on the basis of the technical solution of the disclosure, as shown in FIGS. 20 and 21, the disclosure further provides a decorative film 700. The decorative film 700 may include the dazzling colored base layer 100, the first decorative layer 3 and the second decorative layer 4. The dazzling colored base layer 100 may include a first surface and a second surface that are oppositely arranged. The second decorative layer 4 is arranged on the second surface of the dazzling colored base layer 100, and the first decorative layer 3 is arranged on the first surface of the dazzling colored base layer 100. On the basis of this, the same dazzling colored base layer 100 is used as a carrier, one side of which is formed through a winding spreading or winding coating process, while the other side is formed with a conventional coating or transfer printing process, such that a double color display effect is achieved by processing two sides of the dazzling colored base layer 100 respectively. Compared with the solution that a carrier is required to be arranged for each color effect layer in a sequential layer-by-layer stacking process in the related art, the solution of the disclosure has the advantages that a color display effect may be enriched while the decorative film 700 is thinned.

Step 2101, specifically obtain a dazzling colored base layer 100, the dazzling colored base layer 100 including a first surface and a second surface that are oppositely arranged.

In this example, the dazzling colored base layer 100 may be obtained through the processing method of any one of the above embodiments, which will not be repeated in detail herein.

Step 2102, form a first decorative layer 3 on the first surface of the dazzling colored base layer 100.

In this example, for specific implementations, reference may be made to the above embodiments, which will not be repeated in detail herein.

Step 2103, form a second decorative layer 4 on the second surface of the dazzling colored base layer 100.

In this example, for specific implementations, reference may be made to the above embodiments, which will not be repeated in detail herein.

Figure 22:
FIG. 22 is sixth schematic sectional view of a decorative film illustrated according to an embodiment.

As shown in FIG. 22, as an embodiment in which the first decorative layer 3 includes a semitransparent ink layer 31 and a first coating layer 32, and the second decorative layer 4 including a texture layer 41, a second coating layer 42 and a cover bottom ink layer 43, the semitransparent ink layer 31 may be arranged on the first surface of the dazzling colored base layer 100, and the first coating layer 32 may be arranged on a surface, away from the dazzling colored base layer 100, of the semitransparent ink layer 31. The texture layer 41 may be arranged on the second surface of the dazzling colored base layer 100, the second coating layer 42 may be arranged on a surface, away from the dazzling colored base layer 100, of the texture layer 41, and the cover bottom ink layer 43 may be arranged on a surface, away from the texture layer 41, of the second coating layer 42.

Figure 23:
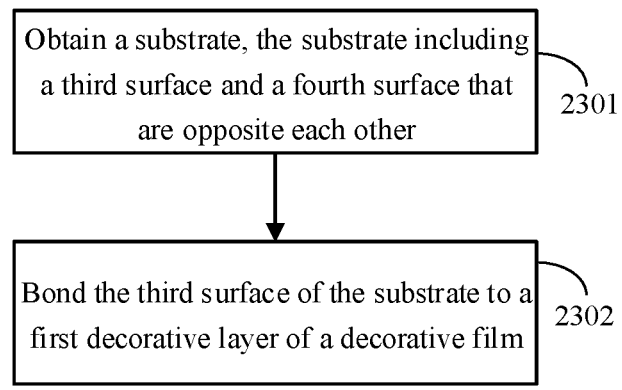
FIG. 23 is a fourth flow diagram of a processing method for a housing illustrated according to an embodiment.
Figure 24:
FIG. 24 is a seventh schematic sectional view of a housing illustrated according to an embodiment.

As shown in FIGS. 23 and 24, the disclosure further provides a housing 800. The housing 800 may include a substrate 801 and a decorative film 700. As an embodiment in which the decorative film 700 serves as the example shown in FIG. 22, specifically, the processing method for the housing 800 may include the following steps:

Step 2301, obtain a substrate 801, the substrate 801 being capable of including a third surface and a fourth surface that are opposite each other.

In this example, for step 2301, reference may be made to step 301, which will not be repeated in detail herein.

Step 2302, bond the substrate 801 to the first decorative layer 3 of the decorative film 700.

Figure 25:
FIG. 25 is an eighth schematic sectional view of a housing illustrated according to an embodiment.

In this example, the first decorative layer 3 may include a semitransparent ink layer 31 and a first coating layer 32, the semitransparent ink layer 31 may be arranged between the first coating layer 32 and the dazzling colored base layer 100, and the first coating layer 32 is bonded to the substrate 801. By means of the semitransparent ink layer 31, a main display color effect of the housing 800 may be designed; in combination with the dazzling colored base layer 100, the dazzling colored effect may be achieved; and by means of the first coating layer 32, brightness and color richness of the housing 800 may be increased. Specifically, the substrate 801 may be bonded to the first coating layer 32 of the first decorative layer 3. For example, a bonding layer may be bonded to the substrate 801 in advance, and then the decorative film 300 is unrolled, and the unrolled decorative film 300 is bonded to the bonding layer. Alternatively, the bonding layer may be bonded to the decorative film 300 to form a roll, and then the roll is unrolled to be bonded to the substrate 801 after the cover film of the bonding layer is torn off, which may be specifically designed as required and is not limited in the disclosure The second decorative layer 4 may include a texture layer 41, a second coating layer 42 and a cover bottom ink layer 43. After the first decorative layer 3 is bonded to the substrate 801, the texture layer 41, the second coating layer 42 and the cover bottom ink layer 43 may be sequentially formed. Alternatively, the texture layer 41, the second coating layer 42 and the cover bottom ink layer 43 may be sequentially formed on the second surface of the dazzling colored base layer 100, and then the first coating layer 32 may be bonded to the substrate 801, which is not limited in the disclosure. Further, as shown in FIG. 25, the housing 800 may further include an anti-fingerprint layer 802, and the corresponding processing method for the housing 800 may further include: form an anti-fingerprint layer on the fourth surface of the substrate 801. The anti-fingerprint layer 802 may form an outer surface of the housing 800, which may be conducive to reducing dirt in a process of holding the device by a user and maintaining cleanliness of the device.

It should be noted that in the above example, the decorative film 700 includes the first decorative layer 3 and the second decorative layer 4, the first decorative layer 3 includes the semitransparent ink layer 31 and the first coating layer 32, and the second decorative layer 4 includes the texture layer 41, the second coating layer 42 and the cover bottom ink layer 43. In fact, in other embodiments, under the condition that the decorative film 700 includes the first decorative layer 3 and the second decorative layer 4, for a structure of the first decorative layer 3, reference may be made to any one of the above embodiments, and for a structure of the second decorative layer 4, reference may be made to any one of the above embodiments, which will not be repeated in detail herein.

On the basis of the technical solution of the disclosure, the disclosure further provides an electronic device, and the electronic device may include the housing in any one of the above embodiments. The electronic device may include a mobile phone, a tablet computer, a wearable device, etc., and the housing may include a battery cover.

Those skilled in the art could easily conceive of other implementation solutions of the disclosure upon consideration of the description and the disclosure disclosed in the implementations. The disclosure is intended to cover any variations, uses or adaptive changes of the disclosure, which follow the general principles of the disclosure and include common general knowledge or customary technical means, which is not disclosed in the disclosure, in the art.

It should be understood that the disclosure is not limited to a precise structure which has been described above and illustrated in the accompanying drawings, and may have various modifications and changes without departing from the its scope.

Additional non-limiting embodiments of the disclosure include:

1. A processing method for a dazzling colored base layer, including:
   outputting first materials and second materials alternately, a refractive index of the first materials being different from a refractive index of the second materials;
   obtaining a film by carrying out tape casting on the first materials and the second materials that are alternately arranged; and
   obtaining, by extending the film, the dazzling colored base layer having first material layers and second material layers that are alternately arranged, a thickness of the dazzling colored base layer being less than a thickness of the film.

2. The processing method according to embodiment 1, wherein the film has a thickness greater than or equal to 1 mm and less than or equal to 5 mm, and the dazzling colored base layer has a thickness greater than or equal to 20 μm and less than or equal to 100 μm.

3. The processing method according to embodiment 1 or 2, wherein extending the film includes:
   obtaining a secondary film by stretching the film in a first direction; and
   obtaining the dazzling colored base layer by stretching the secondary film in a second direction, the first direction being perpendicular to the second direction.

4. The processing method according to embodiment 3, wherein the obtaining a secondary film by stretching the film in a first direction includes:
   heating the film to a temperature higher than or equal to 85° C. and lower than or equal to 95° C.; and
   stretching the heated film in the first direction; and
   the obtaining the dazzling colored base layer by stretching the secondary film in a second direction includes:
   heating the secondary film to a temperature higher than or equal to 100° C. and lower than or equal to 120° C.; and
   obtaining the dazzling colored base layer by stretching the heated secondary film in the second direction.

5. The processing method according to any one of embodiments 1-4, further including:
   heat-setting the dazzling colored base layer; and
   rolling the heat-set dazzling colored base layer.

6. The processing method according to embodiment 5, wherein a temperature for the heat-setting the dazzling colored base layer is higher than or equal to 230° C. and lower than or equal to 240° C.

7. The processing method according to embodiment 1, wherein a melting temperature for carrying out tape casting on the first materials and the second materials that are alternately arranged is higher than or equal to 260° C. and lower than or equal to 290° C.

8. A processing method for a decorative film, including:
   obtaining the dazzling colored base layer according to the processing method of any one of embodiments 1-7, the dazzling colored base layer including a first surface and a second surface that are oppositely arranged; and
   obtaining the decorative film by forming a first decorative layer on the first surface, and/or forming a second decorative layer on the second surface.

9. The processing method according to embodiment 8, wherein forming the decorative layer on the first surface includes:

forming a semitransparent ink layer on the first surface of the dazzling colored base layer.

10. The processing method according to embodiment 8, wherein forming the decorative layer on the first surface includes:
    forming a first coating layer on the first surface of the dazzling colored base layer.

11. The processing method according to embodiment 8, wherein forming the decorative layer on the first surface includes:
    forming a semitransparent ink layer on the first surface of the dazzling colored base layer; and
    forming a first coating layer on a surface, away from the dazzling colored base layer, of the semitransparent ink layer.

12. The processing method according to embodiment 9 or 11, wherein forming the semitransparent ink layer includes:
    forming the semitransparent ink layer with a winding spreading process.

13. The processing method according to embodiment 9 or 11, wherein the semitransparent ink layer has a thickness greater than or equal to 1 μm and less than or equal to 6 μm.

14. The processing method according to embodiment 10 or 11, wherein forming the coating layer includes:
    forming the first coating layer with a winding coating process.

15. The processing method according to embodiment 10 or 11, wherein the first coating layer includes first metal oxide layers and second metal oxide layers that are alternately arranged, and a material of the first metal oxide layers is different from a material of the second metal oxide layers.

16. The processing method according to embodiment 15, wherein the first metal oxide layers and the second metal oxide layers each include one of the following layers:
    a titanium oxide layer, a silicon oxide layer and a niobium oxide layer.

17. The processing method according to embodiment 8, wherein forming the second decorative layer on the second surface includes:
    forming a cover bottom ink layer on the second surface of the dazzling colored base layer.

18. The processing method according to embodiment 8, wherein forming the second decorative layer on the second surface includes:
    forming a texture layer on the second surface of the dazzling colored base layer;
    forming a second coating layer on a surface, away from the dazzling colored base layer, of the texture layer; and
    forming a cover bottom ink layer on a surface, away from the texture layer, of the second coating layer.

19. A processing method for a housing, including:
    obtaining a substrate, wherein the substrate includes a third surface and a fourth surface that are opposite each other; and
    obtaining the housing by bonding the third surface of the substrate to the first surface or the first decorative layer of the decorative film obtained through the processing method of any one of embodiments 8-18; alternatively obtaining the housing by bonding the third surface of the substrate to the dazzling colored base layer obtained through the processing method of any one of embodiments 1-7.

20. The processing method according to embodiment 19, further including:
    forming an anti-fingerprint layer on the fourth surface of the substrate.

21. A dazzling colored base layer, including:
    first material layers; and
    second material layers, the second material layers and the first material layers being alternately arranged, and a refractive index of a material of the first material layer being different from a refractive index of a material of the second material layer.

22. The dazzling colored base layer according to embodiment 21, wherein the first material layers and the second material layers each include an organic resin layer respectively.

23. The dazzling colored base layer according to embodiment 22, wherein the organic resin layer includes a polyethylene terephthalate polymer layer.

24. The dazzling colored base layer according to embodiment 21, wherein a total number of the first material layers and the second material layers is greater than or equal to 100 and less than or equal to 1000.

25. The dazzling colored base layer according to embodiment 21, wherein each of a refractive index of a first materials and a refractive index of a second materials is greater than or equal to 1.58 and less than or equal to 1.65.

26. The dazzling colored base layer according to embodiment 21, wherein the dazzling colored base layer has a thickness greater than or equal to 20 μm and less than or equal to 100 μm.

27. The dazzling colored base layer according to embodiment 21, wherein the first material layer and/or the second material layer have/has a thickness greater than or equal to 50 nm and less than or equal to 500 nm.

28. The dazzling colored base layer according to embodiment 21, wherein the first material layers and/or the second material layers have a light transmittance greater than or equal to 90%.

29. A decorative film, including:
    the dazzling colored base layer of any one of embodiments 21-28, the dazzling colored base layer including a first surface and a second surface that are oppositely arranged; and
    a first decorative layer and/or a second decorative layer, the first decorative layer being arranged on the first surface, and the second decorative layer being arranged on the second surface.

30. The decorative film according to embodiment 29, wherein the decorative film includes a first decorative layer, and the first decorative layer includes a semitransparent ink layer arranged on the first surface.

31. The decorative film according to embodiment 29, wherein the decorative film includes a first decorative layer, and the first decorative layer comprises a first coating layer arranged on the first surface.

32. The decorative film according to embodiment 29, wherein the decorative film includes a first decorative layer, the first decorative layer includes a semitransparent ink layer and a first coating layer, the semitransparent ink layer is arranged on the first surface, and the first coating layer is arranged on a surface, away from the dazzling colored base layer, of the semitransparent ink layer.

33. The decorative film according to embodiment 30 or 32, wherein the semitransparent ink layer has a thickness greater than or equal to 1 μm and less than or equal to 6 μm.

34. The decorative film according to embodiment 31 or 32, wherein the first coating layer includes first metal oxide layers and second metal oxide layers that are alternately arranged, and a material of the first metal oxide layers is different from a material of the second metal oxide layers.

35. The decorative film according to embodiment 34, wherein the first metal oxide layers and the second metal oxide layers each comprise one of the following layers:
a titanium oxide layer, a silicon oxide layer and a niobium oxide layer.

36. The decorative film according to any one of embodiments 29-35, wherein the decorative film includes a second decorative layer, and the second decorative layer includes a cover bottom ink layer arranged on the second surface.

37. The decorative film according to any one of embodiments 29-35, wherein the decorative film includes a second decorative layer, the second decorative layer includes a texture layer, a second coating layer and a cover bottom ink layer, the texture layer is arranged on the second surface, the second coating layer is arranged on a surface, away from the dazzling colored base layer, of the texture layer, and the cover bottom ink layer is arranged on a surface, away from the texture layer, of the second coating layer.

38. A housing, including:
a substrate, the substrate including a third surface and a fourth surface that are opposite each other; and
the decorative film according to any one of embodiments 29-37, a first surface or a first decorative layer of the decorative film being bonded to the third surface of the substrate; alternatively, the dazzling colored base layer of any one of embodiments 21-28, the dazzling colored base layer being bonded to the third surface of the substrate.

39. The housing according to embodiment 38, further including an anti-fingerprint layer, the anti-fingerprint layer being arranged on the fourth surface of the substrate.

40. An electronic device, including the housing of embodiment 38 or 39.

41. The electronic device according to embodiment 40, wherein the housing includes a battery cover.

The invention claimed is:

1. A decorative film, comprising:
a dazzling colored base layer, comprising:
first material layers; and
second material layers, the second material layers and the first material layers being alternately arranged, and a refractive index of a material of the first material layers being different from a refractive index of a material of the second material layers;
the dazzling colored base layer further comprising a first surface and a second surface that are oppositely arranged; and
a first decorative layer and/or a second decorative layer, the first decorative layer being arranged on the first surface, wherein the first decorative layer includes a semitransparent ink layer and a first coating layer, the semitransparent ink layer is arranged on the first surface, and the first coating layer is arranged on a surface, away from the dazzling colored base layer, of the semitransparent ink layer, the semitransparent ink layer is formed by a winding spreading process, and the first coating layer is formed by a winding coating process; and the second decorative layer being arranged on the second surface, wherein the second decorative layer includes a texture layer, a second coating layer and a cover bottom ink layer, the texture layer is arranged on the second surface, the second coating layer is arranged on a surface, away from the dazzling colored base layer, of the texture layer, and the cover bottom ink layer is arranged on a surface, away from the texture layer, of the second coating layer.

2. The decorative film according to claim 1, wherein each of a refractive index of the first material layers and a refractive index of the second material layers is greater than or equal to 1.58 and less than or equal to 1.65.

3. The decorative film according to claim 1, wherein the first material layers and/or the second material layers have a light transmittance greater than or equal to 90%.

4. A housing, comprising:
a substrate, the substrate comprising a third surface and a fourth surface that are opposite each other; and
the decorative film according to claim 1, a first surface or a first decorative layer of the decorative film being bonded to the third surface of the substrate.

5. An electronic device, comprising:
a housing, wherein the housing comprises:
a substrate, the substrate comprising a third surface and a fourth surface that are opposite each other; and
a decorative film, wherein the decorative film comprises:
a dazzling colored base layer, the dazzling colored base layer comprises first material layers, second material layers, a first surface and a second surface that are oppositely arranged, the second material layers and the first material layers being alternately arranged, and a refractive index of a material of the first material layers being different from a refractive index of a material of the second material layers;
a first decorative layer and/or a second decorative layer, the first decorative layer being arranged on the first surface, wherein the first decorative layer includes a semitransparent ink layer and a first coating layer, the semitransparent ink layer is arranged on the first surface, and the first coating layer is arranged on a surface, away from the dazzling colored base layer, of the semitransparent ink layer, the semitransparent ink layer is formed by a winding spreading process, and the first coating layer is formed by a winding coating process; and the second decorative layer being arranged on the second surface, and wherein the second decorative layer includes a texture layer, a second coating layer and a cover bottom ink layer, the texture layer is arranged on the second surface, the second coating layer is arranged on a surface, away from the dazzling colored base layer, of the texture layer, and the cover bottom ink layer is arranged on a surface, away from the texture layer, of the second coating layer; and
the first surface or the first decorative layer of the decorative film being bonded to the third surface of the substrate.

6. The decorative film according to claim 1, wherein a total number of layers of the first material layers and the second material layers is greater than or equal to 100 and less than or equal to 1000.

7. The decorative film according to claim 1, wherein the first material layers and/or the second material layers have a thickness greater than or equal to 50 nm and less than or equal to 500 nm.

* * * * *